Feb. 25, 1941. G. E. ARMINGTON ET AL 2,233,193
DUMP WAGON
Filed Dec. 1, 1937
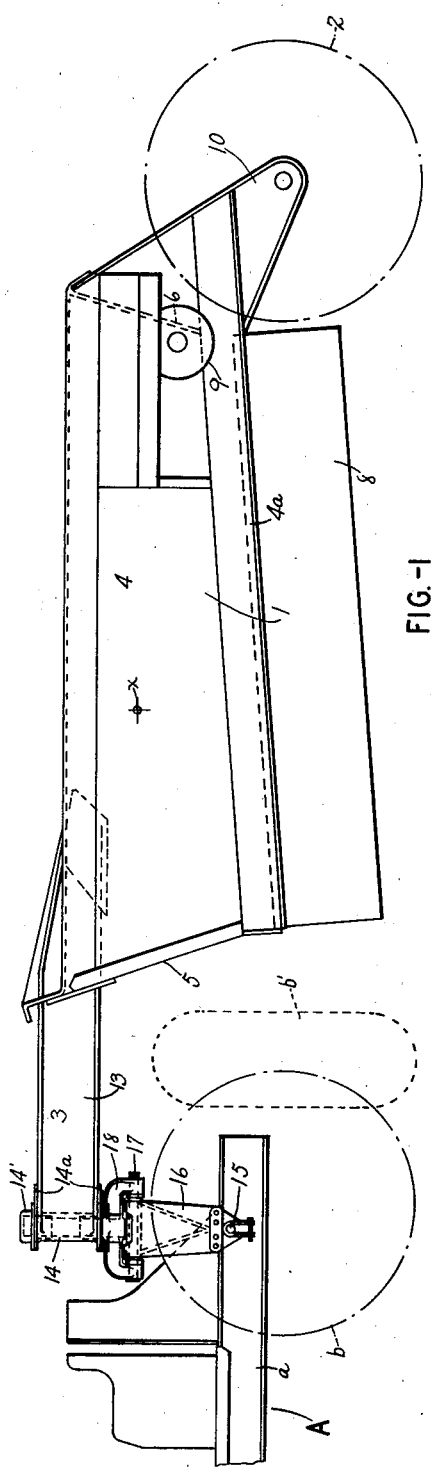
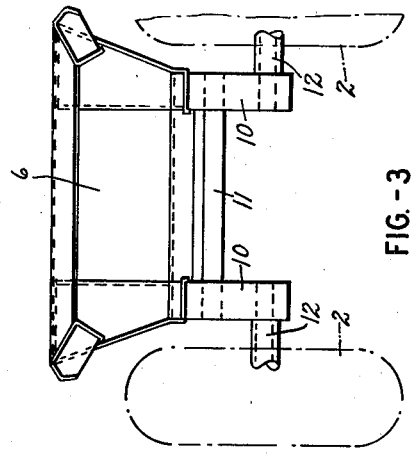
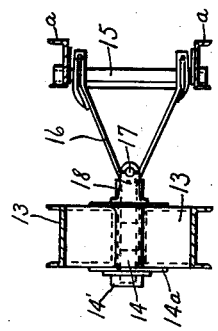
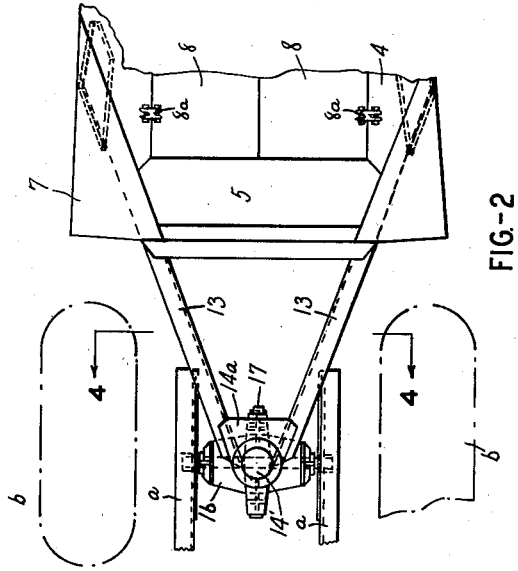
INVENTORS
GEORGE E. ARMINGTON
STEWART F. ARMINGTON
BY
ATTORNEYS Patented Feb. 25, 1941

2,233,193

UNITED STATES PATENT OFFICE 2,233,193

DUMP WAGON

George E. Armington, South Euclid, and Stewart F. Armington, Willoughby, Ohio, assignors to The Euclid Road Machinery Company, Euclid, Ohio, a corporation of Ohio Application December 1, 1937, Serial No. 177,518

2 Claims. (Cl. 298—35)

This invention relates to large heavy-duty bottom-dump trailers and means for hitching the same to their tractors by which they are to be hauled. In such a trailer the bottom dumping body must ride high enough to permit its side-hinged doors to drop to dumping position, and to clear the dumped load, but such necessary elevation of the body tends toward instability of the trailer. An object of this invention is to attain improved stability in this arrangement, and more particularly by providing a tractor hitch of novel form wherein lateral tilting between tractor and trailer vehicles is about an axis effectively substantially as high as the center of gravity of the loaded trailer.

The novel hitch means, as another object of the invention, provides a low transverse axis for relative motion between the vehicles whereby to minimize tendency of the draft load of the trailer to cause the tractor to rear.

It is necessary that such a trailer have its body sufficiently rearward of the tractor rear or driving wheels as to clear the latter in making sharp turns. Yet it is desirable that as much of the tractor load as possible rest upon the tractor for traction purposes. Another object of the invention is to so proportion the trailer body and so relate it to its wheels and the tractor that more of its weight will be carried by the tractor than has heretofore been found possible in the art. At the same time, as will appear, the invention provides improved clearance of the trailer from the dumped load.

For support and draft between trailer and tractor, a rigid drawbar is provided elevated to clear the tractor wheels in turning, and another object of the invention is to provide improvements in such drawbar especially adapting it to the trailer and hitch features of the invention.

The exact nature of this invention together with further objects and advantages thereof will be apparent from the following description taken in connection with the accompanying drawing, in which Figs. 1, 2 and 3 are somewhat conventionalized views in side elevation, plan and rear elevation respectively, illustrating an embodiment of the invention, Figs. 1 and 2 illustrating pertinent parts of a tractor to which the trailer is shown as hitched; and Fig. 4 is a sectional detail as in the plane of line 4—4, Fig. 2.

With reference now to the drawing the principal parts of the trailer are a body 1 having a pair of supporting wheels 2 disposed rearwardly thereof and an elevated drawbar 3 extending forwardly thereof for support upon a tractor.

A represents generally the tractor having side frame members $a$ and rear driving wheels $b$.

It is contemplated that the trailer wheels 2, the tractor driving wheels $b$, and its usual steering wheels not shown, be all provided with pneumatic rubber tires as indicated, although other types of wheels, tires or wheel substitutes might be employed if preferred.

The trailer body has side panels 4 which together with a front panel 5 and a rear panel 6 form generally a hopper having four side walls extending divergently upwardly from a rectangular bottom opening and each wall disposed generally in a plane. The wall parts are so proportioned and arranged that the plane of the dumping opening has a forward slope as indicated Fig. 1, the upper edges of the side walls 4 are horizontal and the front wall 5 extends preferably somewhat above the side walls and has associated aprons 7 at the forward corners of the body. Also the proportions are such that in transverse section the body capacity increases from the rear to the front above the dumping opening. Thus the center of gravity indicated at $x$, of the loaded body, is decidedly forward of its endwise center and as high as indicated, since, as will be appreciated, in service the body is customarily filled with a heaped load.

For controlling its dumping opening, a pair of doors 8, hinged to the lower extremities of the side walls 4 as indicated at 8$a$, are provided, these doors being indicated as open in Fig. 1, as closed in Fig. 2, and not appearing in Fig. 3.

Associated with the doors for their operation is suitable means such as the winding gear conventionally indicated at 9, shown in detail in Patent No. 2,055,919 issued September 29, 1936 to Armington et al.

It may be noted that when the load has been dumped by opening of the doors as in Fig. 1, forward progression of the trailer will be facilitated, since the rearward ends of the doors are higher than their forward ends.

For support of the body at its rear end a pair of laterally spaced legs 10 extend rearwardly and downwardly from the rear side 5 of the body reinforced by the bottom rails 4$a$ of the sides and a bar 11. The legs 10 carry stub shafts 12 upon which the wheels 2 are mounted. The arrangement may be noted as essentially that of an arched axle practically unitary with the body, the arch portion of which is located forwardly of its stub shaft portions.

Drawbar means are provided for support of the body at its forward end comprising essentially a pair of straight structural steel members 13 converging from the body to a head casting 14. Each of the members 13 is connected with its body side 4 rearwardly of the forward end of the body and cuts across its corner of the body beneath its apron 7 and has its connection with the head 14 reinforced by plates 14a, the parts being welded together to form a rigid unitary structure. The members 13 are horizontally disposed in the general plane of the top of the body, and may be preferably tapered as indicated to their connections with their side members.

The proportions are such that the head 14 is sufficiently forward of the body that the latter may clear the tractor wheels in conditions of sharp steering angularity between the vehicles as indicated at b', and also such that the weight on the tractor drive wheels and trailer wheels is substantially equal with a fully loaded body.

For support of the head 14 upon the tractor, with the members 13 elevated above the tractor wheels b, and for draft of the trailer, hitch means are provided carried by the tractor.

Such hitch means comprise a bar 15 extending between and carried by the tractor side frame members a, and preferably located ahead of the centers of the tractor driving wheels b. A member 16 is mounted upon this bar for fore-and-aft rocking motion and carries at its upper extremity a longitudinal pin 17. Tiltably mounted upon the pin 17 is a yoke 18 having an upright post rotatably fitting within the drawbar head 14, a shoulder on the yoke 18 supporting the weight of the head. The head 14 preferably has a cap 14' over the end of the post of the yoke 18 to protect the bearing of the latter in the head.

It will be apparent that the hitch means provides a transverse axis—that of the bar 15—permitting raising and lowering of the tractor wheels b relative to the forward wheels of the tractor and to the trailer wheels 2, a longitudinal axis—that of the pin 17—permitting lateral tilting between the two vehicles, and an upright axis—that of the post of the yoke 18—permitting turning motion between the vehicles; the hitch means obviously providing draft of the trailer while permitting its described motion in the three planes.

The parts are so proportioned and arranged that the lateral tilting axis, that of the pin 17, is approximately at least as high as the center of gravity $x$ of the loaded body, so that the trailer is stable and does not tend to tip sideways. In the example illustrated the center of gravity $x$ is aligned with the pin 17.

The bar 15 being at a low elevation and forward of the centers of the tractor driving wheels b, should the trailer be mired and excess power applied to the tractor wheels, the tendency of the weight of the trailer upon the tractor is to prevent the forward end of the tractor from rising from the ground. This weight is always on the driving wheels b to maintain their traction and is a greater proportion of the total loaded trailer weight than has heretofore been provided in the art. In actual practice we have attained a load of 19,500 pounds upon the tractor drive wheels as against 19,600 pounds divided between the two trailer wheels.

What we claim is:

1. A trailer dump vehicle having a load containing body comprising side and end walls and having a bottom comprising door means opening downwardly and hingedly connected with the side walls, wheel means supporting said body at its rear end, drawbar means supporting said body at its forward end, said side walls having lower edges sloping forwardly and downwardly so as to progressively increase the load carrying capacity of said body toward the front and to permit the body rearwardly of a given point to more easily pass over the load dumped at that point, and said wheel means comprising a wheel disposed at each side of the body and leaving the space therebetween unobstructed to more easily pass over a freshly dumped load.

2. A dump vehicle having a load containing body comprising side and end walls and a bottom comprising door means extending over substantially the entire bottom, said door means opening to discharge the load downwardly, said side walls having their lower edges extending progressively lower from rear to front of said body so as to increase the load carrying capacity of the body toward the front and to permit the body rearwardly of a given point to more easily pass over the load dumped at that point, and wheel means supporting said body, said wheel means at the rear of said body being disposed at each side thereof and leaving the space therebetween unobstructed to more easily pass over a freshly dumped load.

GEORGE E. ARMINGTON.
STEWART F. ARMINGTON.